Jan. 3, 1950     M. P. ODELL     2,493,311
ELECTRIC TEMPERATURE SENSING DEVICE
Filed Nov. 20, 1944     2 Sheets-Sheet 1
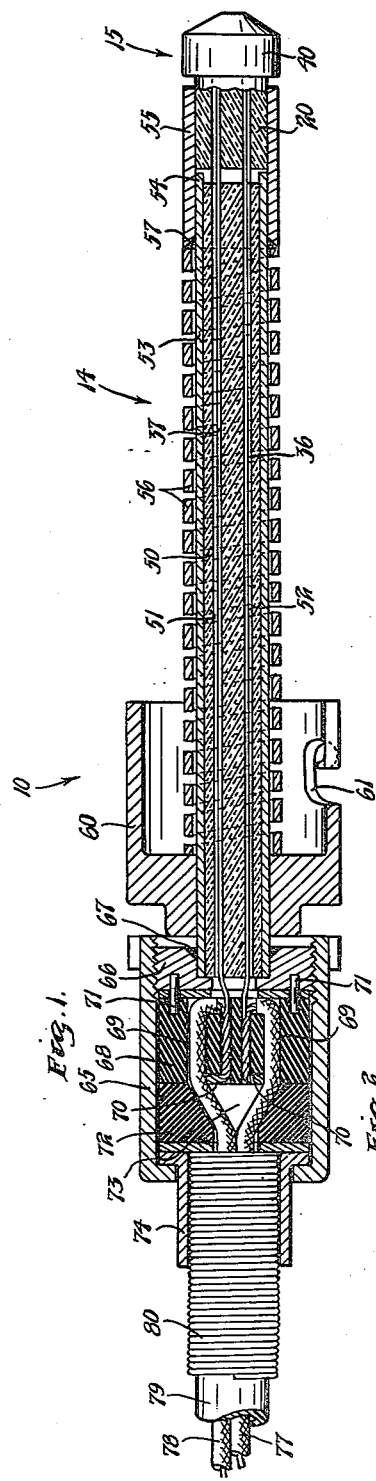
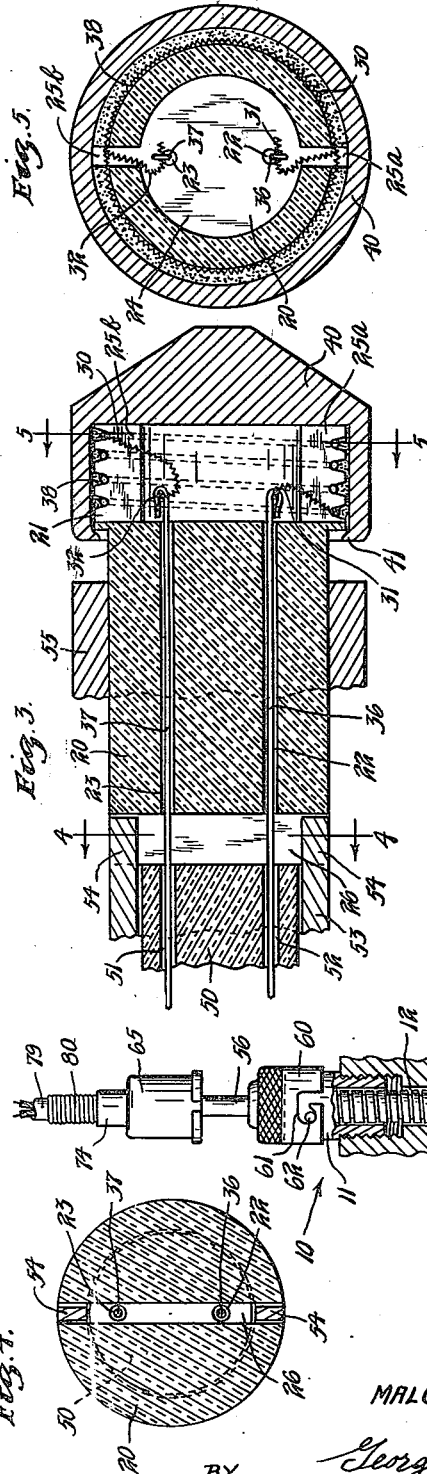
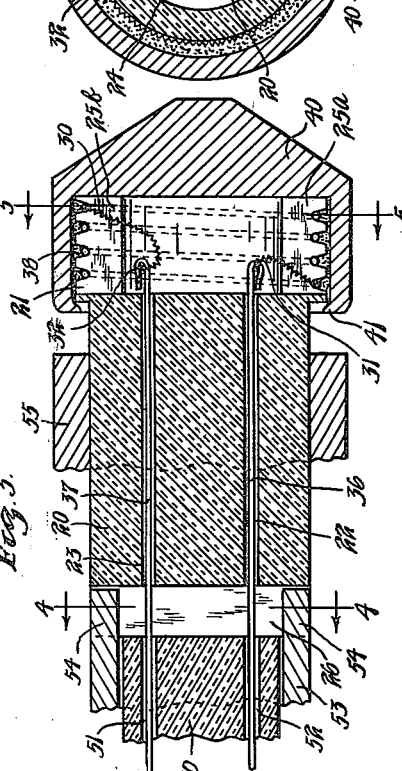
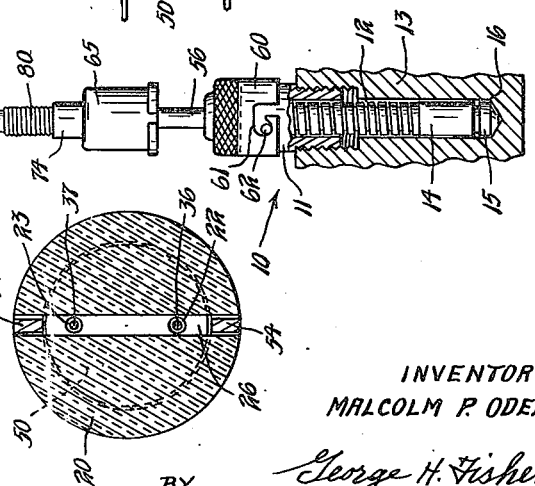
INVENTOR
MALCOLM P. ODELL
BY *George H. Fisher*
ATTORNEY Jan. 3, 1950 M. P. ODELL 2,493,311
ELECTRIC TEMPERATURE SENSING DEVICE
Filed Nov. 20, 1944 2 Sheets-Sheet 2
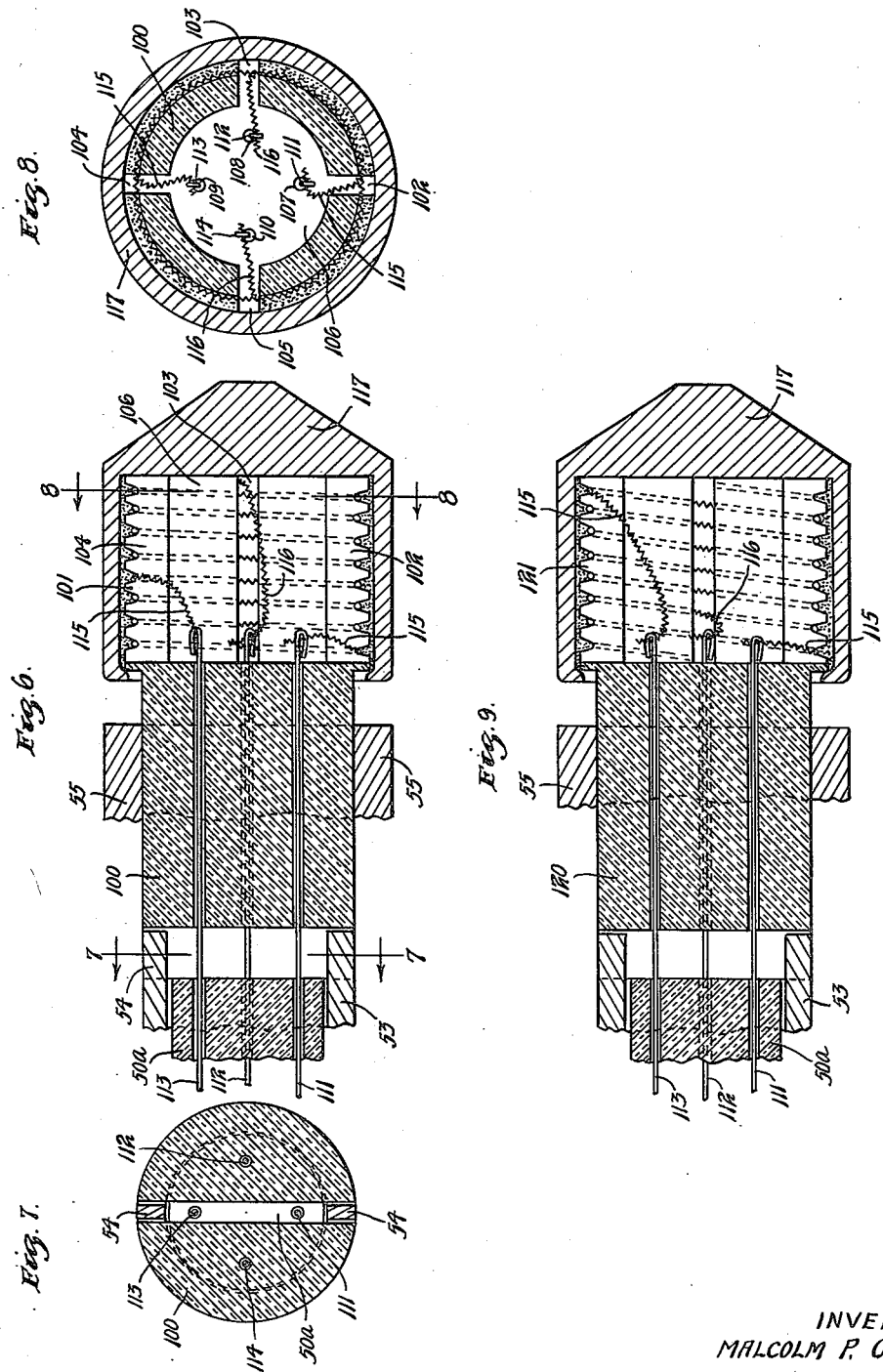
INVENTOR
MALCOLM P. ODELL
BY George H. Fisher
ATTORNEY Patented Jan. 3, 1950

2,493,311

UNITED STATES PATENT OFFICE 2,493,311

ELECTRIC TEMPERATURE SENSING DEVICE

Malcolm P. Odell, Minneapolis, Minn., assignor to Minneapolis-Honeywell Regulator Company, Minneapolis, Minn., a corporation of Delaware Application November 20, 1944, Serial No. 564,378

13 Claims. (Cl. 201—63)

My invention is directed to an improved temperature sensing device of the type wherein a change of temperature of the medium surrounding a sensitive portion of the device affects the resistivity of a conductor mounted in the sensitive portion of said device. In particular, my invention is intended to sense the temperature of a closely defined area of a medium, which area is remote from the surface of said medium, in such a manner that the measurement will not be affected by the gradient which exists between the selected area and the surface of the medium.

While such a device may have utility in numerous fields it has particular value in sensing the temperature of an aircraft engine, where it may be applied to indicate the temperature and also to direct a mechanism which is provided to control engine temperature. However, this single disclosure of the use of my device is not to be interpreted as limiting its utility solely to the aircraft engine field.

At the present time, the manufacturers of air-cooled types of aircraft engines are confronted with a serious problem of temperature control when the engines are used in the conventional type of airplane. The conventional method of controlling the temperature of the engine is by means of a series of peripherial flaps on the cowling of the engine nacelle which permit escape of air entering the open front end of the cowl. Numerous problems are confronted in controlling the positioning of these flaps, but because of the multiplicity of other tasks which confront the operator it is desirable that they be automatically controlled in conformity with the temperature of the engine except under certain emergency conditions.

It was the prior art practice to control the actuator which is provided to position the flaps by devices such as are shown, for example, in the copending applications of Raymond P. Mattern, Serial No. 442,312, filed May 9, 1942, which issued as Patent 2,363,075 on November 21, 1944, and Serial No. 464,823, filed November 6, 1942 which issued as Patent 2,372,840 on April 3, 1945. In the former of these applications, a temperature responsive element is provided for measuring the temperature at the base of the spark plug on the engine head; while in the latter application, a temperature responsive element is fitted in an aperture of a part of the engine. While devices of this nature may have utility in certain types of engines they have been found to be unsatisfactory in engines of the air-cooled type. In the first of the aforementioned disclosures, the temperature which is measured is that which exists at the surface of the engine beneath the spark plugs and in the second case the measured temperature represents an average temperature over the length of the sensitive portion of the device. Because of the development of more complex engines having multiple banks of cylinders, and because of problems inherent with the construction of the engine the cooling problem has required that the temperature be measured at a critical point in the engine.

The principal manufacturers of air-cooled engines have uniformly agreed that the desirable place to measure the temperature of an air-cooled engine is at a point remote from the surface thereof and near the combustion chamber. To this extent the engines of more recent design are now to be produced with a drilled out passage extending into the area at which the vital temperature is to be indicated. While the depth of the passage is immaterial insofar as the present invention is concerned, the engine designers found that under certain operating conditions the temperature of the medium surrounding this drilled out passage, or the metal forming the engine head had a gradient along the depth of the passage which may approach 100 degrees F., per inch. Of course this gradient will vary in accordance with conditions under which the engine is operated, but for control purposes it was deemed essential that an accurate measurement be made at the base or closed end of the passage, and that the indicated temperature should not vary materially from the temperature existing at this point. Furthermore, a definite limitation was placed on the size of the element which was to be used for measuring the temperature at this sensitive or reference point, which considerably added to the problem and which was a further bar to devices of the prior art. The engine manufacturers found that the maximum space which could be allowed for drilling the measuring passage was extremely small and in fact the temperature measuring element which was to be fitted into this passage must be restricted to an outside diameter of approximately ¼ of an inch.

Thus the problem was resolved into requirements that the element must be extremely small in size and must be capable of measuring the temperature in an area, which to all practical extent may be regarded as approaching a point remote from the surface of the medium and that such measurement must not be altered or diminished by the temperatures existing elsewhere in the engine such as the lowering or increasing gradient which exists at points nearer the surface of the engine. My invention was developed to satisfy this need and the results were accomplished through a new and different arrangement of parts. A particular feature of my invention is that a plurality of resistance conductors may be arranged within the limited space so that for example, one of the conductors may be connected actuator or other device for positioning the cowl flaps and the other conductor may be connected through proper arrangement with a panel mounted instrument to visibly indicate to the operator or engineer the temperature of the engine head.

An object of my invention is to provide a temperature responsive resistance element for sensing the temperature of an area of a medium, which area is remote from the surface of said medium.

Another object is to construct a temperature responsive resistance element of material which will permit the size of the element to be extremely small and thus adaptable for insertion in a passage having a limited dimension.

Another object is to provide a temperature responsive resistance element having a core structure and a resistive conductor spirally wound thereon of such size and material that the longitudinal dimension of the winding does not substantially exceed its cross dimension.

A further object is to provide a temperature responsive resistance element having two resistive conductors spirally wound thereon in such a manner that each of said conductors will be subject to substantially the same temperature of the surrounding medium.

A still further object is to provide a means of putting the temperature responsive resistance element in a medium in such a manner that the temperature surrounding the supporting structure will not affect the resistance element.

Other and further objects will become evident in the following description and claims, and in the appended drawings of which:

Figure 1 is an enlarged side view of the complete device with certain parts in cross section;

Figure 2 is a side elevation of the device mounted in a well of an engine;

Figure 3 is a greatly enlarged cross sectional view of the core and cap structure;

Figure 4 is a cross sectional view taken on the line 4—4 of Figure 3;

Figure 5 is a cross sectional view taken on the line 5—5 of Figure 3;

Figure 6 is a modification of the device shown in Figure 3;

Figure 7 is a cross sectional view taken on the line 7—7 of Figure 6;

Figure 8 is a cross sectional view taken on the line 8—8 of Figure 6; and,

Figure 9 is another modification of that portion of the device shown in Figure 6.

Referring to the drawing and particularly to Figure 2, the measuring device indicated in Figure 1 by the general reference numeral 10 is adapted to fit within the opening of an adapter 11 into a well 12 which has been drilled in a medium such as the head of an engine indicated by the reference numeral 13. The device 10 is provided with a shank portion 14 and a temperature sensitive portion 15. It is a specific purpose of this device that it shall be capable of measuring the temperature which exists in a remote point of the passage which point is designated as 16 in the well 12. Furthermore it is specifically desired that the temperature responsive portion 15 should not be affected by the changing temperature gradient which exists at points closer to the surface of the engine and that the temperatures existing in the other areas shall not be conducted to the sensitive portion 15 by the shank portion 14.

Referring now to Figures 1, 3, 4 and 5 a cylindrical core member 20, formed of ceramic material, is provided with a threaded shoulder portion 21 and a pair of apertures 22 and 23 which extend longitudinally through the core member 20. Within the threaded shoulder portion 21 is a hollowed out portion 24 and a pair of longitudinal cuts 25a and 25b which extend through the threaded shoulder portion 21 and which are positioned adjacent the longitudinal apertures 22 and 23. At the opposite end of the core member 20 is another longitudinal cut 26 which extends across the entire diameter of the core member 20. The longitudinal cuts 25a and 25b and 26 are in the same plane and are therefore shown in Figures 4 and 5 which are sectional views through the opposite ends of the core member 20.

A coiled resistance wire 30 having end portions 31 and 32 is shown as spirally wound within the grooves of the shoulder portion 21. The resistance wire 30 has a number of noteworthy characteristics. Primarily, it is formed of tungsten which is a metal that may be produced in a pure form and has a relatively high coefficient of resistance. Furthermore, it has an extremely high tensile strength which will permit it to be formed into wire of extremely small diameter. These features are of considerable advantage, for I have utilized them to select a resistive conductor, which for a given dimension and temperature, will always provide a constant resistivity and will not be affected by small quantities of impurities, and also a wire of extremely small diameter which has sufficient tensile strength to enable it to be helically wound on a mandrel so as to compress a considerable length of wire into a relatively small coil. In the case of other forms of commercially available resistance wire, which may for example be nickel or a nickel iron alloy, the first difficulty is found in the fact that impurities or slight differences in the proportion of alloyed materials will destroy the uniformity of the temperature coefficient of resistance which may exist between different lots of wire, and furthermore wires formed of these materials are not to my knowledge available in sufficiently small diameters to give sufficiently high resistance per unit length, or if they are available they would lack the tensile strength needed in this type of device.

According to the method which I use, tungsten wire in the neighborhood of .00035 inch in diameter is helically wound on a mandrel, which mandrel is removed by dissolving. The length of wire and number of turns is adjusted so as to produce a helically wound element of a predetermined resistance having a length of approximately 2 inches. For example, a resistance conductor of this type might be formed from a section of wire which is approximately 20 inches in length and wound into approximately 2500 turns so as to form a finished element about two inches in length having an overall diameter in the order of about .005 inch. It will be readily recognized that this is a practical manner of forming a compact resistive conductor, because of the strength of the metal and the manner of arranging it as set forth above.

One end 31 of the resistance conductor 30 is clamped in a turned up end of a silver lead 36 and soldered thereto whereafter the conductor 30 is passed outwardly from the hollowed out portion 24 through the longitudinal cut 25a and spirally wound on the threaded shoulder 21 for 3½ turns whereupon the opposite end of the conductor 32 is brought inwardly through the cut 25b and fastened to another silver lead 37 in the same manner in which the end 31 was fastened to the conductor 36. The clenched ends of the leads 36 and 37 are then firmly drawn up in the hollowed out portion 24 in such a manner as to securely hold the conductor 30 on the threaded shoulder portion 31. An insulating cement shown as 38 is placed over the conductor 30 in sufficient quantity to fill the grooves of the shoulder portion 21. A cap 40 of high conductive material, preferably silver, and having a tapered end portion, which is designed to fit the tapered end portion of the well 12, is slipped over the shouldered portion 21 and secured thereon by rolling as shown at 41. In order to gain a comprehension of the size of the heat sensitive element 15, the over-all dimensions of the silver cap 40 are approximately .15 inch in length and .25 inch in diameter. While these exact dimensions are not of extreme importance it is evident therefrom that the shouldered portion 21 supporting the winding 30 is of greater cross dimension than its length or stated conversely, the length is not greater than the cross dimension. This is an important feature of this invention, because of the nature of materials used in devices of the prior art the resistance winding was always of considerably greater length than its cross dimension thus causing considerable temperature lag or gradient.

The supporting structure indicated by the general reference numeral 14 has a cylindrical insulating member 50 formed preferably of ceramic material and is provided with tubular apertures 51 and 52 which cooperate with the apertures 22 and 23 in the core member 20 to provide two insulated paths for the conductors 36 and 37. The member 50 firmly abuts the core member 20 at one end and is positioned within a metallic tube 53 which extends over the full length of the member 50. A pair of tongued projections 54 on one end of the tube 53 engage within the longitudinal cut 26 of the core member 20 and serve to prevent rotation of the core member 20. A sleeve 55 extends over one end of the tube 53 and a portion of the core member 20 and serves to support the junction of the core member 20 and the insulated member 50. It will be observed that although this sleeve member 55 in part encases the core member 20 it is clearly separated from the silver cap 40 of the temperature sensitive portion indicated by the general reference numeral 15. While this separation might be accomplished in numerous ways its purpose is to prevent the conduction of heat between the members 40 and 55 thus to heat insulate these members from each other in such a manner that the heat picked up by the cap 40 will not be dissipated through the sleeve 55 and its associated parts. The sleeve 55 is soldered at one end to the tube 53 as shown by the reference numeral 57.

A tubular cap member 60 is slidably mounted on the tube 53 in resilient engagement with a spring 56 which is provided to give a firm engagement of the sensitive element within the well. The cap 60 is provided with an eccentric cut-out portion in a part of its periphery 61 to provide a bayonet joint with the projection 62 on the adapter 11 as shown in Figure 2.

With the supporting structure disclosed herein the temperature sensitive element may be resiliently held in engagement with the closed end of the well in such a manner that it cannot be injured by vibration of the engine. Furthermore the supporting structure, because of its separation from the cap 40, cannot conduct heat away from the temperature sensitive portion. Also, the silver leads 36 and 37 are both heat and electrically insulated so that the temperatures existing near the outer portion of the well are not conveyed through these leads to the temperature sensitive winding.

When a device of this nature is mounted on the head of an internal combustion engine it will normally be subject to considerable vibration and possibly to a certain amount of rough handling in installing and removing it from the engine head. Accordingly, a novel form of strain release has been provided for connecting heavier lead wires to the silver leads 36 and 37. A tubular cap structure 65 is provided with a bushing 66 which is threaded into one end thereof. The bushing 66 is soldered to the tube 53 as shown at 67. Within the cap structure 65 is a cylindrical insulating member 68 which is provided with two large passages 69, and two small passages 70. Member 68 is secured to the bushing 66 by the pins 71, as shown in Figure 1. Abutting the insulating member 68 is another insulating member 72 which is cylindrical in form and provided with a funnel shaped aperture 73. A ferule 74 is positioned with its flanged portion inside of the cap member 65 with one of its openings adjacent the funnel shaped portion 73 of the insulator 71. A washer 75 is located between the bushing 66 and the insulator 68, and a washer 76 is located between the insulator 72 and the ferule 74.

A pair of insulated lead wires 77, 78, are provided for connecting the temperature sensitive device to an external control mechanism. These wires extend inwardly through the ferule 74 and pass through the funnel shaped aperture 73 to the insulator 68. As these wires pass from the aperture 73 to the large passages 69 they are bent outwardly and after passing through the passage 69 they are bent inwardly to join the silver leads 36 and 37. At this junction point the insulation is stripped from the wires 77, 78 and each wire is brought into intimate contact with a corresponding silver lead whence the two pairs of wires are passed inwardly through the narrow passages 70 after which they are bent and soldered. In this arrangement any strain which may be exerted on the wires 77, 78, will be snubbed by the tortuous path provided for the wires by the members 68 and 71 and will thus prevent their being torn loose from conductors 36 and 37. If any movement at all is imparted to conductors 36 and 37 it is in a direction to loosen them rather than in a direction which puts strain on them. This arrangement will also prevent injury to the frangible resistive conductor 30. The lead wires 77 and 78 are encased in a moisture proof casing 79 which in turn is surrounded by a spring 80, provided to protect the wires.

Referring now to Figures 6 to 9 there are shown two modified forms of the structure disclosed in Figure 3. Under certain conditions it may be desirable to make more than one measurement of the temperature at the sensitive portion 15 of the element. One temperature indication may be utilized to operate a control mechanism such as an actuator and another temperature indication may be utilized to operate a visible temperature indicating instrument mounted on the panel to indicate to the operator the temperature existing at the sensitive portion of the device. In Figure 6 is shown a core structure 100 which is substantially the same as core structure 20 except that the shoulder portion 101 is substantially twice as great in length as shoulder 21. The shoulder portion 101 is provided with longitudinal cuts 102, 103, 104, and 105 which are spaced at 90 degrees with relation to each other about the periphery of the shoulder 101 and communicate with the hollow portion 106. Four apertures 107, 108, 109, and 110 are provided in the core 100 which extend longitudinally through the core member 100 with one end adjacent the cuts 107, 108, 109 and 110. Silver lead wires 111, 112, 113, and 114 are positioned in these apertures. One end of a resistance conductor 115 which is of same proportions as conductor 30 is connected to the lead wire 111 and extends outward through the cut 102 whence it is wound for 3½ turns on the shoulder 101 and passes inward through the cut 104 to be fastened to the lead 113. A second resistance wire 116 of the same size and proportions as conductor 115 is fastened to the lead wire 114 and starts one quarter turn after resistance 115 has been turned inwardly to join lead 113, and continues for 3½ turns after which it is brought in to join lead 112. In this arrangement two resistive conductors are consecutively mounted on different portions of the shoulder 101 and will measure substantially the same temperature because of the high heat conductive properties of a silver cap member 117. In such an arrangement the tubular insulator 50a is substantially the same as insulator 50 except that it is provided with four apertures. Likewise a correspondently different arrangement would be provided for connecting the various means in the strain release member.

Referring now to Figure 9 there is shown still another modification in which two substantially equal temperature indications can be obtained from the temperature sensitive portion. In this arrangement the core member 120 is provided with a threaded shoulder portion 121 having a double spiral thread cut thereon. In this arrangement the two resistive conductors 115 and 116 are wound in a side-by-side relationship in consecutive threads on the shoulder portion 121, it being understood that the resistive conductor 116 starts its winding 90 degrees clockwise on the shoulder 121 from the conductor 115. The lead wire 114 is not shown in this drawing but it will correspond to that shown in Figure 8 and would be positioned in a cut out portion of the device which is nearest the reader.

It will be observed in the disclosures of Figures 6 and 9 that the cross dimension of the windings on the shoulders 101 and 121 are substantially greater than the longitudinal measurement of the winding which thus permits the winding to become greatly compressed in size and because of the high heat conductivity of the cap structure 117 temperatures existing even at the angular surface of the cap are readily transmitted to the entire sensitive portion of the device.

It will be apparent to those skilled in the art that I have provided novel means of measuring temperature of an area of a medium which area may be closely restricted and yet in such a manner that other areas in the medium which may have different temperatures will have no effect upon the reading or measurement made at the remote area. While I have disclosed certain measurements and materials used in my invention and one purpose for which the invention may be utilized, these measurements, materials and uses may be altered within the spirit of the invention.

I claim as my invention:

1. An insertion temperature sensing device comprising, a member of relatively high heat conduction characteristics having a cylindrical inner surface, a temperature responsive resistance wire helically coiled to lie inside said member adjacent the cylindrical surface thereof, a ceramic element supporting said wire and said member, and a metal sleeve supporting said ceramic element but terminating out of contact with said member to prevent heat conduction therebetween.

2. A temperature responsive resistance element adapted for insertion in a medium, including, a core structure, a resistive conductor mounted on said core structure, an enclosure of high heat conductive material closely enclosing said resistive conductor on a portion of said core structure, a first pair of conductors joined to the opposite ends of said resistive conductor and extending through passages in said core structure, a second pair of conductors adapted for connection to electrical means external of said element, means including strain release means for supporting the junction of said first and second pairs of conductors comprising, a first member having a central passage, a second member having a plurality of passages, said two members positioned in abutting relationship with each other at one end in such a manner that said second pair of conductors pass through said first member and by a tortuous path through the plurality of passages in said second member, and said first and second pairs of conductors joined in said second member in such a manner as to provide snubbing action against strain exerted by said second pair of conductors.

3. A temperature responsive resistance element, comprising, an elongated core structure and two temperature sensing resistive conductors circumferentially mounted thereon and disposed as a double helix at one end thereof, said two temperature sensing resistive conductors being electrically insulated from each other to provide substantially equal and independent indications of temperature, said element being characterized by the longitudinal dimension of said core structure at the area where it supports said two temperature sensing resistive conductors being such that it does not exceed the cross dimension of said core.

4. A device for measuring the temperature in a closely defined area of a remote portion of a passage, comprising, a temperature sensitive resistance element having a temperature sensitive portion adapted to be inserted in said passage so as to extend into said closely defined area of said remote region, a pair of insulated conductors connected to said element and extending out of said passage, said device being characterized by the longitudinal dimension of the temperature sensitive portion of said element being not substantially greater than the cross dimension of said element.

5. A temperature responsive resistance element, comprising, a core structure and two electrically independent temperature responsive resistance conductors circumferentially mounted on substantially the same area of said core structure, an enclosure formed of material having a high heat conducting capacity encasing said conductors in such a manner as to be in intimate heat transfer relationship with each of said conductors whereby each of said conductors is subjected to substantially the same amount of heat transfer from said enclosure, and said element being characterized by the longitudinal dimension of said core structure at the area where it supports said two conductors does not xeced the cross dimension thereof.

6. A temperature responsive resistance element, comprising, a core structure and two electrically independent temperature responsive resistance conductors circumferentially mounted in spaced consecutive order with respect to each other on one end of said core structure, an enclosure formed of material having a high heat conducting capacity encasing said conductor in such a manner as to be in intimate heat transfer relationship with each of said conductors whereby each of said conductors is subjected to substantially the same amount of heat transfer from said enclosure, and said element being characterized by the longitudinal dimension of said core structure at the area where it supports said two conductors does not exceed the cross dimension thereof.

7. In a temperature sensing device, in combination, a cylindrical core of ceramic material, a temperature sensing element carried by said core at one end thereof, electrical connectors extending from said element longitudinally through said core, a cap having a cylindrical periphery and of high heat conducting metal covering one end of said core and said element, and a supporting metal sleeve over said core but spaced from said cap by a distance less than the diameter of said core.

8. In a temperature sensing device, in combination, a cylindrical core of ceramic material, a temperature sensing element carried by said core at one end thereof, electrical connectors extending from said element longitudinally through said core, a cap having a cylindrical periphery and of high heat conducting metal covering one end of said core and said element, said cap having a length less than twice its diameter and a supporting metal sleeve over said core but spaced from said cap, said sleeve having an outside diameter substantially the same as said cap.

9. In a temperature sensing device, in combination, a cylindrical ceramic core, a temperature sensitive resistance embedded in one end of said core adjacent a peripheral surface thereof, connecting wires from said resistance extending longitudinally through said core, a cap of high heat conductivity covering the end of said core and said resistance, said cap being in heat conducting relation with said core adjacent said resistance, and a supporting metal sleeve engaging said core but spaced from said cap by a distance less than the diameter of said core.

10. A device for sensing the temperature of a surface comprising, a member of relatively high heat conduction characteristics having two heat transfer surfaces, a temperature responsive resistance wire disposed adjacent one of said surfaces, the other of said surfaces being adapted to engage a surface the temperature of which is to be sensed, a ceramic member carrying said wire and said first named member, and a metal sleeve supporting and encasing said ceramic member and terminating adjacent said first named member but spaced therefrom to prevent heat conduction therebetween.

11. A device for sensing the temperature of a surface comprising, a member of relatively high heat conduction characteristics having two heat transfer surfaces, a temperature responsive resistance wire disposed adjacent one of said surfaces, a ceramic member carrying said wire and said first named member, a metal sleeve supporting and encasing said ceramic member and terminating adjacent said first named member but spaced therefrom to prevent heat conduction therebetween, and resilient means adapted to bias said sleeve to force the other of said heat transfer surfaces into intimate heat conducting relationship with a surface whose temperature is to be sensed by said resistance wire.

12. A device for sensing the temperature of a surface comprising, a member of relatively high heat conduction characteristics, said member having a conical heat transfer surface and a cylindrical heat transfer surface coaxially disposed, a coil of wire the resistance of which varies with temperature disposed adjacent the cylindrical heat transfer surface, a member of relatively low heat conduction characteristics carrying said first named member and said wire coil, and resilient means adapted to bias said last named member axially of the heat transfer surfaces of said first named member to bias the conical surface thereof into intimate heat conductive relation with a complementary surface the temperature of which is to be sensed.

13. A device for sensing the temperature of a surface comprising, a member of relatively high heat conduction characteristics, said member having a conical heat transfer surface and a cylindrical heat transfer surface coaxially disposed, a coil of wire the resistance of which varies with temperature disposed adjacent the cylindrical heat transfer surface, a ceramic member carrying said first named member and said coil and a metal sleeve encasing and supporting said ceramic member but spaced from said first named member to prevent heat conduction therebetween, and resilient means adapted to bias said sleeve to bias the conical surface of said first named member into intimate heat conductive relation with a complementary surface the temperature of which is to be sensed by said wire.

MALCOLM P. ODELL.

REFERENCES CITED

The following references are of record in the file of this patent:

UNITED STATES PATENTS

| Number | Name | Date |
|---|---|---|
| Re. 21,716 | Bacon | Feb. 18, 1941 |
| 1,101,939 | Knauff | June 30, 1914 |
| 1,190,978 | Bliss | July 11, 1916 |
| 1,294,607 | Boardman | Feb. 18, 1919 |
| 1,331,496 | Goldthwaite | Feb. 28, 1920 |
| 1,879,253 | Horstkotte | Sept. 27, 1932 |
| 2,102,030 | Quereau | Dec. 14, 1937 |
| 2,135,078 | Hubbard et al. | Nov. 1, 1938 |
| 2,149,448 | Lederer et al. | Mar. 7, 1939 |
| 2,156,853 | Huggins, Jr. | May 2, 1939 |
| 2,271,975 | Hall | Feb. 3, 1942 |
| 2,318,822 | Wantz | May 11, 1943 |
| 2,363,975 | Mattern | Nov. 21, 1944 |
| 2,379,317 | Picciano | June 26, 1945 |